United States Patent
Cheng et al.

(10) Patent No.: US 11,243,595 B2
(45) Date of Patent: Feb. 8, 2022

(54) METHOD AND APPARATUS FOR REDUCING CONTINUOUS-WAKEUP DELAY OF BLUETOOTH LOUDSPEAKER, AND BLUETOOTH LOUDSPEAKER

(71) Applicant: SHENZHEN GRANDSUN ELECTRONIC CO., LTD., Shenzhen (CN)

(72) Inventors: Wen Cheng, Shenzhen (CN); Haiquan Wu, Shenzhen (CN); Dayong Tang, Shenzhen (CN); Enqin Zhang, Shenzhen (CN); Lei Cao, Shenzhen (CN); Ruiwen Shi, Shenzhen (CN)

(73) Assignee: SHENZHEN GRANDSUN ELECTRONIC CO., LTD., Shenzhen (CN)

( * ) Notice: Subject to any disclaimer, the term of this patent is extended or adjusted under 35 U.S.C. 154(b) by 349 days.

(21) Appl. No.: 16/369,456

(22) Filed: Mar. 29, 2019

(65) Prior Publication Data
US 2019/0302867 A1    Oct. 3, 2019

(30) Foreign Application Priority Data

Mar. 30, 2018  (CN) .......................... 201810276974.0

(51) Int. Cl.
*G06F 1/32*      (2019.01)
*G06F 1/3209*    (2019.01)
(Continued)

(52) U.S. Cl.
CPC .......... *G06F 1/3209* (2013.01); *G06F 1/3287* (2013.01); *G06F 3/167* (2013.01);
(Continued)

(58) Field of Classification Search
CPC ..... G06F 1/32; G06F 1/12; G06F 1/28; G06F 1/00; G06F 9/44
See application file for complete search history.

(56) References Cited

U.S. PATENT DOCUMENTS

| 5,249,217 A * | 9/1993 | Lee ....................... H04M 1/656 455/412.1 |
| 2003/0076745 A1* | 4/2003 | Chapman ................ G01W 1/10 368/10 |

(Continued)

FOREIGN PATENT DOCUMENTS

| CN | 106507244 A | 3/2017 |
| CN | 106601232 A | 4/2017 |

(Continued)

OTHER PUBLICATIONS

The extended European search report dated Aug. 9, 2019, by the European Patent Office in corresponding European Patent Application No. 19166248.5. (8 pages).

*Primary Examiner* — Keshab R Pandey
(74) *Attorney, Agent, or Firm* — Buchanan Ingersoll & Rooney PC (57) ABSTRACT

The present disclosure is applicable to the technical field of loudspeaker and provides a method and apparatus for reducing continuous-wakeup delay of Bluetooth loudspeaker and a Bluetooth loudspeaker. The method for reducing continuous-wakeup delay of Bluetooth loudspeaker includes: resetting a wakeup flag bit to wait for a next wakeup when receiving a stop-recording instruction which is sent by a terminal equipment through a Bluetooth serial port communication protocol; and executing a wakeup-interruption operation again after a preset wakeup keyword is received. According to the present disclosure, time delay under a (Continued)

Resetting a wakeup flag bit to wait for a next wakeup when a stop-recording instruction sent by a terminal device through a Bluetooth serial port communication protocol is received — S101

Executing a wakeup-interruption operation again after a preset wakeup keyword is received — S102 continuous-wakeup mode can be greatly reduced and a response speed of continuous-wakeup can be improved.

19 Claims, 3 Drawing Sheets

(51) Int. Cl.
*G06F 1/3287* (2019.01)
*H04R 3/00* (2006.01)
*H04W 52/02* (2009.01)
*G10L 15/22* (2006.01)
*G06F 3/16* (2006.01)
*H04W 4/80* (2018.01)

(52) U.S. Cl.
CPC ............... *G10L 15/22* (2013.01); *H04R 3/00* (2013.01); *H04W 52/0229* (2013.01); *H04W 52/0235* (2013.01); *H04W 52/0274* (2013.01); *H04R 2420/07* (2013.01); *H04W 4/80* (2018.02)

(56) References Cited

U.S. PATENT DOCUMENTS

| 2016/0087813 A1* | 3/2016 | Takai ..................... H04L 69/08 370/338 |
| 2016/0116972 A1* | 4/2016 | Shin ....................... G06F 3/0659 711/162 |
| 2018/0122378 A1 | 5/2018 | Mixter et al. |
| 2019/0005954 A1 | 1/2019 | Xie et al. |
| 2019/0057695 A1* | 2/2019 | Xie ......................... G06F 3/167 |
| 2019/0141298 A1* | 5/2019 | Vaidya ............... G06K 9/00268 |
| 2020/0312309 A1* | 10/2020 | Lin ........................ G06N 7/005 |

FOREIGN PATENT DOCUMENTS

| CN | 107134279 A | 9/2017 |
| CN | 107146618 A | 9/2017 |
| CN | 107277272 A | 10/2017 |
| DE | 20 2017 106 668 U1 | 2/2018 |
| WO | 2017/166066 A1 | 10/2017 |

* cited by examiner

METHOD AND APPARATUS FOR REDUCING CONTINUOUS-WAKEUP DELAY OF BLUETOOTH LOUDSPEAKER, AND BLUETOOTH LOUDSPEAKER

TECHNICAL FIELD

The present disclosure relates to the technical field of loudspeaker, and more particularly to a method for reducing continuous-wakeup delay of Bluetooth loudspeaker, an apparatus for reducing continuous-wakeup delay of Bluetooth loudspeaker, a Bluetooth loudspeaker, and a computer readable storage medium.

BACKGROUND

With the development of voice recognition technology, intelligent loudspeaker devices with voice wakeup function are developed rapidly. An intelligent Bluetooth loudspeaker has advantages of being small in size, low in power consumption, and convenient to be carried, etc., and thus is widely used in real life.

However, due to the fact that the intelligent Bluetooth loudspeaker needs to be connected with a mobile phone firstly during networking, this process may take certain time, and the reaction delay may be even longer especially in a continuous-wakeup process, so that the user experience is poor.

SUMMARY

In view of this, embodiments of the present disclosure provide a method and apparatus for reducing continuous-wakeup delay of Bluetooth loudspeaker, and a Bluetooth loudspeaker, which may reduce time delay under a continuous-wakeup mode and improve a wakeup efficiency.

In a first aspect, embodiments of the present disclosure provide a method for reducing continuous-wakeup delay of a Bluetooth loudspeaker, including steps of:

resetting a wakeup flag bit to wait for a next wakeup when a stop-recording instruction sent by a terminal equipment through a Bluetooth serial port communication protocol is received; and executing a wakeup-interruption operation again after a preset wakeup keyword is received.

In a second aspect, embodiments of the present disclosure provide an apparatus for reducing continuous-wakeup delay of a Bluetooth loudspeaker, including:

a reset module configured to reset a wakeup flag bit to wait for a next wakeup when a stop-recording instruction sent by a terminal equipment through a Bluetooth serial port communication protocol is received; and an execution module configured to execute a wakeup-interruption operation again after a preset wakeup keyword is received.

In a third aspect, the embodiments of the present disclosure provide a Bluetooth loudspeaker, including: a memory, a processor and a computer program stored in the memory and executable on the processor, where when the computer program is executed by the processor, the processor is configured to implement the method mentioned in the first aspect.

In a fourth aspect, the embodiments of the present disclosure provide a computer readable storage medium, the computer readable storage medium stores a computer program, when the computer program is executed by the processor, the method mentioned in the first aspect is implemented.

Compared with the related art, the advantageous effects achieved by the embodiments of the present disclosure are as follows: in the embodiments of the present disclosure, the wakeup flag bit is reset to wait for the next wakeup when the stop-recording instruction which is sent by the terminal equipment through the Bluetooth serial port communication protocol is received, and the wakeup-interruption operation is executed again after the preset wakeup keyword is received. According to the embodiments of the present disclosure, time duration spent on re-establishing connection is saved, and the support of the Bluetooth loudspeaker on the continuous-wakeup mode is increased; what's more, the next wakeup operation may be directly performed without waiting for the whole process of the previous wakeup operation to be completely accomplished, the influence of the previous wakeup operation on the next wakeup operation is weakened, time duration which lasts from re-detecting to awakening the keyword is saved, the efficiency of continuous-wakeup is improved, so that the present disclosure is high in usability and practicability.

BRIEF DESCRIPTION OF THE DRAWINGS

In order to explain the embodiments of the present disclosure more clearly, a brief introduction regarding the accompanying drawings that need to be used for describing the embodiments of the present disclosure or the related art is given below; it is obvious that the accompanying drawings described as follows are only some embodiments of the present disclosure, for the person of ordinary skill in the art, other drawings may also be obtained according to the current drawings on the premise of paying no creative labor.

DESCRIPTION OF THE EMBODIMENTS

In the following description, in order to describe but not intended to limit, concrete details such as specific system structure, technique, and so on are proposed, thereby facilitating comprehensive understanding of the embodiments of the present disclosure. However, it will be apparent to the ordinarily skilled one in the art that, the present disclosure may also be implemented in some other embodiments without these concrete details. In some other conditions, detailed explanations of system, apparatus, circuit and method well known to the public are omitted, so that unnecessary details can be prevented from obstructing the description of the present disclosure.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should also be understood that, terms used in the description of the present disclosure are for the purpose of describing specific embodiments but not intended to limit the present disclosure. As is used in the description and the annexed claims of the present disclosure, unless other conditions are indicated clearly in the context, otherwise, singular forms of terms such as "a", "one", "the" are intended to include plural forms.

It should be further understood that, terms "and/or" used in the description and the annexed claims of the present disclosure are referred to as any combination of one or a plurality of listed item(s) associated with each other and all possible items, and including these combinations.

As is used in the description and annexed claims, a term "if" can be interpreted as "when" or "once" or "in response to determination" or "in response to detection". Similarly, terms such as "if it is determined that", or "if it is detected that (a described condition or event)" can be interpreted as "once it is determined" or "in response to the determination" or "once it is detected that (the described condition or event)" or "in response to the detection (the described condition or event)".

In a concrete implementation, the terminal equipment described in the embodiments of the present disclosure includes but is not limited to other portable devices such as a mobile phone having a touch sensitive surface (e.g., a touch screen display device and/or a touch panel), a laptop computer or a tablet computer, etc. It should also be understood that, in some embodiments, the device is not a portable communication device, but rather a desktop computer having a touch sensitive surface (e.g., a touch screen display and/or a touch panel).

In the following discussion, the terminal equipment which includes a display and a touch sensitive surface is described. However, it should be understood that, the terminal equipment may include one or a plurality of other physical user interface devices such as a physical keyboard, a mouse and/or a control rod.

The terminal equipment supports various applications, such as one or more of the following applications: a drawing application program, a demonstration application program, a word processing application program, a website creating application program, a disc burning application program, an electronic table application program, a game application program, a telephone application program, a video conference application program, an e-mail application program, an instant messaging application program, an exercise support application program, a photo management application program, a digital camera application program, a digital camera application program, a web browsing application program, a digital music player application program, and/or a digital video player application program.

The various applications that are executable on the terminal equipment may use such as at least one common physical user interface device of the touch sensitive surface. One or more functions of the touch sensitive surface and corresponding information displayed on the terminal equipment may be adjusted and/or changed between applications and/or within a corresponding application. In this way, various application programs with user interfaces which are intuitionistic and transparent to users may be supported by a common physical architecture (e.g., the touch sensitive surface) of the terminal equipment.

It should be understood that, the value of serial number of the steps in this embodiment doesn't mean a sequencing of execution sequences of the steps, the execution sequence of each of the steps should be determined by functionalities and internal logics of the steps themselves, and shouldn't be regarded as limitation to an implementation process of the embodiment of the present disclosure.

It needs to be explained that, for the convenience of describing, the present disclosure is described by taking a first wakeup and a second wakeup in a continuous-wakeup as example, the subsequent continuous-wakeup operations can be executed with reference to the processes of the first wakeup and the second wakeup.

In order to describe the technical solution of the present disclosure, the present disclosure is described with reference to concrete embodiments below.

Embodiment One

Figure 1:
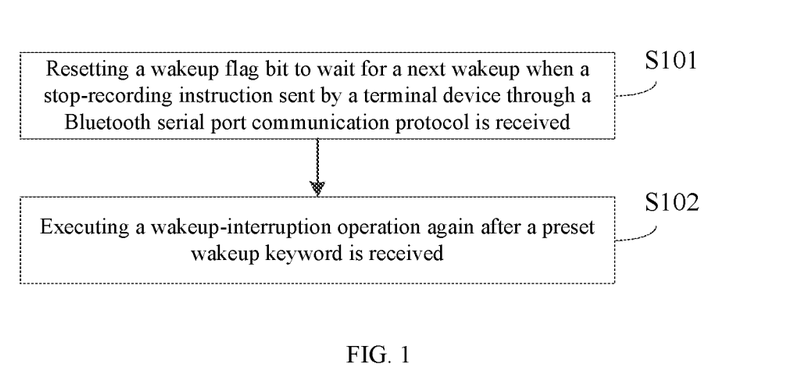
FIG. 1 depicts a schematic block diagram of a method for reducing continuous-wakeup delay of Bluetooth loudspeaker provided by embodiment one of the present disclosure.

FIG. 1 depicts a schematic block diagram of a method for reducing continuous-wakeup delay of a Bluetooth loudspeaker according to embodiment one of the present disclosure, the method may include steps as follows:

S101: resetting a wakeup flag bit to wait for a next wakeup when a stop-recording instruction sent by a terminal equipment through a Bluetooth serial port communication protocol is received.

It should be understood that, a connection has been established between the Bluetooth loudspeaker and the terminal equipment before the stop-recording instruction is sent by the terminal equipment through the Bluetooth serial port communication protocol.

It should also be understood that, after the wakeup flag bit is reset, time duration spent on re-detecting a wakeup keyword may be reduced, such that the Bluetooth loudspeaker may further support a continuous-wakeup mode.

S102: executing a wakeup-interruption operation again after the preset wakeup keyword is received.

The preset wakeup keyword may be set flexibly according to user habits, and is not limited too much.

It should be noted that, the wakeup-interruption operation is to awaken the Bluetooth loudspeaker in a sleep state so as to execute relevant instruction operations after the connection has been established.

In the embodiment of the present disclosure, the wakeup flag bit is reset when the stop-recording instruction sent by the terminal equipment through the Bluetooth serial port communication protocol is received, such that the support of the Bluetooth loudspeaker on the continuous-wakeup mode may be further enhanced, the next wakeup operation may be directly performed without disconnecting a current connection, such that a time duration spent on reestablishing connection is saved; moreover, since the wakeup-interruption operation may be executed again after the preset wakeup keyword is received, the time duration spent on re-detecting and processing the wakeup-interruption may be saved; hence, the present disclosure is high in usability and practicability.

Embodiment Two

Figure 2:
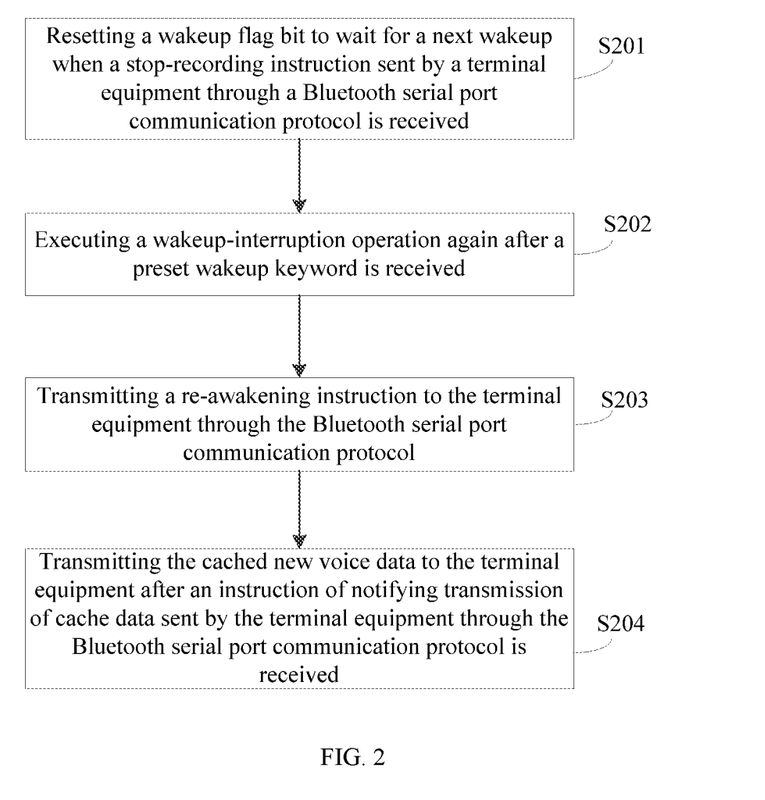
FIG. 2 depicts a schematic block diagram of a method for reducing continuous-wakeup delay of Bluetooth loudspeaker provided by embodiment one of the present disclosure.

FIG. 2 depicts a schematic block diagram of a method for reducing continuous-wakeup delay of a Bluetooth loudspeaker according to embodiment two of the present disclosure, the method may include steps as follows:

S201: resetting a wakeup flag bit to wait for a next wakeup when a stop-recording instruction sent by a terminal equipment through a Bluetooth serial port communication protocol is received.

S202: executing a wakeup-interruption operation again after a preset wakeup keyword is received.

Where, the steps 201-202 are the same as the steps 101-102 in the embodiment one, and are not repeatedly described herein.

S203: transmitting a re-awakening instruction to the terminal equipment through the Bluetooth serial port communication protocol.

It should be understood that, after the re-awakening instruction is sent to the terminal equipment through the Bluetooth serial port communication protocol, both the terminal equipment and the Bluetooth loudspeaker would stop executing related operations in the previous wakeup and directly execute related operations of the current wakeup, thereby further reducing the time delay in the continuous-wakeup process.

Where said stop executing related operations of the previous wakeup at least includes one of conditions as follows: the terminal equipment stops receiving the response data of the voice data collected when the Bluetooth loudspeaker is previously awakened, the terminal equipment stops transmitting the response data of the voice data collected when the Bluetooth loudspeaker is previously awakened to the Bluetooth loudspeaker, the Bluetooth loudspeaker stops receiving the response data of the voice data collected when the Bluetooth loudspeaker is previously awakened, the Bluetooth loudspeaker stops playing the response data of the voice data collected when the Bluetooth loudspeaker is previously awakened and the terminal equipment stops disconnecting with the Bluetooth loudspeaker.

S204: transmitting the cached new voice data to the terminal equipment after an instruction of notifying transmission of cached data sent by the terminal equipment through the Bluetooth serial port communication protocol is received.

It should be understood that, after the terminal equipment receives the new voice data, the terminal equipment may forward the new voice data to a server to be parsed and judged, if the server determines that the response data may be directly obtained from the voice data of the current frame, a stop-recording instruction is sent to the terminal equipment, the terminal equipment forwards the stop-recording instruction to the Bluetooth loudspeaker after receiving the stop-recording instruction, the Bluetooth loudspeaker continues to execute the aforesaid steps 201-203, until the preset wakeup keyword cannot be received in a preset time, the connection between the Bluetooth loudspeaker and the terminal equipment is disconnected.

As can be seen from the above, compared with the embodiment one, the step of reminding that the terminal equipment stops continuously executing operations in the previous wakeup is provided in this embodiment, the time delay in the continuous-wakeup process may be further reduced, which facilitates improving the response speed of continuous-wakeup, therefore, the present disclosure is high in usability and practicability.

Embodiment Three

Figure 3:
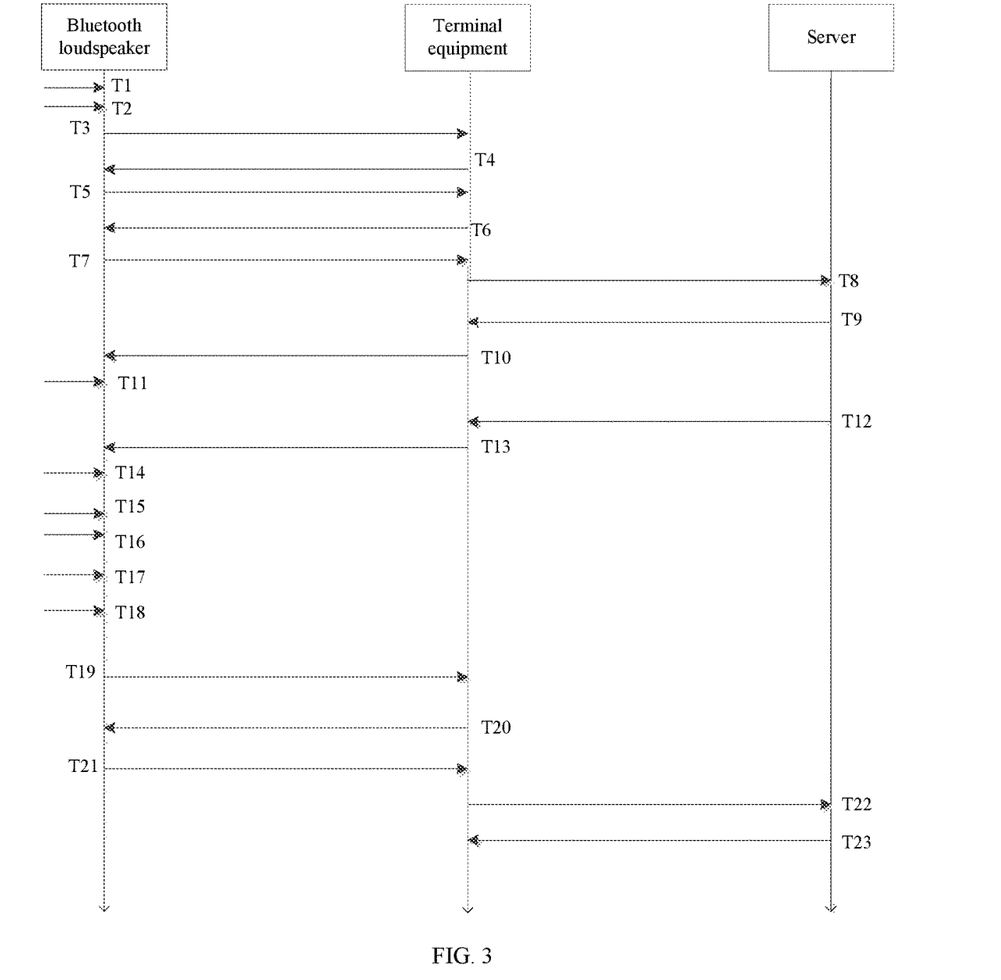
FIG. 3 depicts a schematic block diagram of a concrete implementation of a method for reducing continuous-wakeup delay of Bluetooth loudspeaker provided by embodiment three of the present disclosure.

FIG. 3 depicts a schematic block diagram of a method for reducing continuous-wakeup delay of a Bluetooth loudspeaker according to embodiment three of the present disclosure, the method may include the following steps:

T1: generating a wakeup-interruption by the Bluetooth loudspeaker after a preset wakeup keyword is received by the Bluetooth loudspeaker.

Where, the wakeup-interruption refers to waking up the Bluetooth loudspeaker in a sleep state, so that relevant instruction operation of the first wakeup is executed.

T2: caching a voice data by the Bluetooth loudspeaker after the wakeup-interruption is generated by the Bluetooth loudspeaker.

It should be understood that, certain time usually needs to be spent during the process of establishing a synchronous directional connection between the Bluetooth loudspeaker and the terminal equipment. Therefore, the voice data may be cached firstly so as to avoid lost of voice data before the process of establishing the synchronous directional connection.

T3, transmitting a request for establishing a synchronous directional connection to the terminal equipment by the Bluetooth loudspeaker after the voice data is cached by the Bluetooth loudspeaker.

It needs to be noted that, the terminal equipment is always in a monitoring state and waits for a connection request from the Bluetooth loudspeaker, and sends related procedure of establishing the synchronous directional connection to the Bluetooth loudspeaker after receiving the request for establishing synchronous directional connection sent by the Bluetooth loudspeaker.

T4: transmitting the related procedure of establishing synchronous directional connection to the Bluetooth loudspeaker by the terminal equipment after the request for establishing the synchronous directional connection is received.

Where, the related procedure is used for instructing the Bluetooth loudspeaker to establish the synchronous directional connection according to the procedure. Optionally, the voice data and the response data of the voice data are transmitted through the synchronous directional connection.

T5: transmitting a notification to the terminal equipment by the Bluetooth loudspeaker after the synchronous directional connection is established by the Bluetooth loudspeaker.

Optionally, the notification is sent in the form of message.

T6: making a response by the terminal equipment after the notification is received by the terminal equipment.

The response is used for indicating that the Bluetooth loudspeaker is able to send the voice data.

Where, the steps T3-T6 are the whole process of establishing synchronous directional connection, in the event that the continuous-wakeup mode is supported, the synchronous directional connection needs to be established only when the Bluetooth loudspeaker is initially awakened, and the subsequent continuous-wakeup operations may be directly performed under this connection, so that connection need not to be repeatedly established.

T7: transmitting the voice data to the terminal equipment by the Bluetooth loudspeaker after the response is received by the Bluetooth loudspeaker.

Optionally, the voice data is sent to the terminal equipment through a TCP/IP protocol.

T8: transmitting the voice data to the server by the terminal equipment after the voice data is received by the terminal equipment.

Since the Bluetooth loudspeaker cannot parse the voice data locally, the voice data needs to be sent to the terminal equipment firstly, and then is forwarded by the terminal equipment to the server to be parsed.

T9: transmitting a stop-recording instruction to the terminal equipment by the server after the voice data is received by the server.

It should be noted that, after the server receives the voice data, whether recording may be stopped is determined, if the recording may be stopped, the stop-recording instruction would be sent to the terminal equipment.

T10: transmitting the stop-recording instruction to the Bluetooth loudspeaker by the terminal equipment through the Bluetooth serial port communication protocol after the stop-recording instruction is received by the terminal equipment.

Where, the Bluetooth serial port communication protocol is used for remedying the defect that the stop-recording instruction cannot be sent through the synchronous directional connection, so that synchronizing the states of the terminal equipment and the Bluetooth loudspeaker in time is achieved.

T11: resetting the wakeup flag bit by the Bluetooth loudspeaker to wait for a next wakeup after the stop-recording instruction is received by the Bluetooth loudspeaker.

Optionally, the wakeup flag bit is reset to be 1, and a second wakeup is waited.

It should be understood that, after the wakeup flag bit is reset, the continuous-wakeup operation may still be performed by the Bluetooth loudspeaker without disconnecting the current connection, so that the support on the continuous-wakeup mode is enhanced.

It should be noted that, the time point of generating the second wakeup-interruption may be at any time node after the wakeup flag bit is reset, which includes: the process of receiving the response data returned by the server, and transmitting the response data to the Bluetooth loudspeaker by the terminal equipment, and receiving or playing the response data by the Bluetooth loudspeaker.

T12: transmitting the response data of the voice data to the terminal equipment by the server in the process of waiting for the next wakeup.

It needs to be explained that, the terminal equipment may continue to perform related operation of the previous wakeup before the re-awakening instruction is received by the terminal equipment again.

T13: transmitting the response data returned by the server to the Bluetooth loudspeaker by the terminal equipment if the response data of the voice data is received by the terminal equipment.

Optionally, the response data is sent to the Bluetooth loudspeaker through the synchronous directional connection.

T14: receiving the response data returned by the terminal equipment by the Bluetooth loudspeaker.

Due to the fact that the time point for generating the second wakeup-interruption may be at any time node after the wakeup flag bit is reset, in the event that the terminal equipment has started to send the returned response data to the Bluetooth loudspeaker in the process of waiting to receive the preset wakeup keyword, the Bluetooth loudspeaker receives the response data as fed back by the terminal equipment.

T15: playing the response data by the Bluetooth loudspeaker.

Optionally, when the voice data is played, an echo cancellation firmware is loaded, so that the influence of the echo generated by the voice data on re-detection of the wakeup keyword is weakened.

T16: emptying the cached voice data by the Bluetooth loudspeaker after the response data is played by the Bluetooth loudspeaker.

It should be understood that, when this is limited memory capacity of the Bluetooth loudspeaker, the speed of caching the voice data next-time may be increased and the influence of the previous wakeup on the next wakeup may be eliminated simultaneously by emptying the previously cached voice data.

It needs to be noted that, the steps T12 to T16 are not necessarily performed, the wakeup-interruption operation is executed and the execution of related operation of the previous wakeup is stopped when the preset wakeup keyword is received in any one of the steps T12 to T16. Where said stop performing a related operation of the previous wakeup includes at least one of the following conditions: the terminal equipment stops receiving the response data of the voice data collected when the Bluetooth loudspeaker is previously awakened, the terminal equipment stops transmitting the response data of the voice data collected when the Bluetooth loudspeaker is previously awakened to the Bluetooth loudspeaker, the Bluetooth loudspeaker stops receiving the response data of the voice data collected when the Bluetooth loudspeaker is previously awakened, the Bluetooth loudspeaker stops playing the response data of the voice data collected when the Bluetooth loudspeaker is previously awakened and the terminal equipment stops disconnecting with the Bluetooth loudspeaker. In addition, the terminal equipment in the subsequent step T19 would stop executing the operation of disconnecting connection with the Bluetooth loudspeaker.

T17: receiving the preset wakeup keyword.

Where, when the preset wakeup keyword is received by the Bluetooth loudspeaker, it indicates that the second wakeup operation starts to be performed subsequently.

T18: caching new voice data by the Bluetooth loudspeaker after the preset wakeup keyword is received by the Bluetooth loudspeaker.

Where, regarding the step T18, reference can be made to the step T2 in this embodiment, the step T18 is not repeatedly described herein.

T19: transmitting a re-awakening instruction to the terminal equipment through the Bluetooth serial port communication protocol after new voice data is cached by the Bluetooth loudspeaker.

T20: transmitting the instruction of notifying transmission of cache data by the terminal equipment through the Bluetooth serial port communication protocol after the re-awakening instruction is received by the terminal equipment.

T21: transmitting the cached new voice data to the terminal equipment by the Bluetooth loudspeaker after the instruction of notifying transmission of cached data is received by the Bluetooth loudspeaker.

T22: transmitting the new voice data to the server by the terminal equipment after the new voice data is received by the terminal equipment.

Where, regarding the steps T21-T22, reference can be made to the steps T7-T8 in this embodiment, the steps T21-T22 are not repeatedly described herein.

In addition, in the process of transmitting the new voice data to the terminal equipment, in the event that a new stop-recording instruction which is sent by the terminal equipment through the Bluetooth serial port communication protocol is received, the wakeup flag bit is reset again, and the third wakeup operation is waited.

T23: transmitting a stop-recording instruction to the terminal equipment by the server after the new voice data is received by the server.

Regarding the step T23, reference can be made to step T9 in the embodiment, the step T23 is not repeatedly described herein.

It should be noted that, T1-T23 in FIG. 3 corresponds to the aforesaid steps T1-T23.

As can be seen from the above, when this embodiment is compared with embodiment two, a concrete implementation mode of continuously waking up the Bluetooth loudspeaker twice is given, and the time spent on the two processes of disconnecting the synchronous directional connection and reestablishing connection can be reduced by resetting the wakeup flag bit after the Bluetooth loudspeaker is awoken for the first time, therefore, the support for the continuous-wakeup mode is enhanced; moreover, since the wakeup-interruption may be executed at any time node after the wakeup flag bit is reset, the execution of the second wakeup operation may be started without waiting for the first wakeup operation to be completely accomplished, the time spent on continuous-wakeup for two times is further saved, a response speed of continuous-wakeup is improved, the present disclosure is high in usability and practicability.

Embodiment Four

Figure 4:
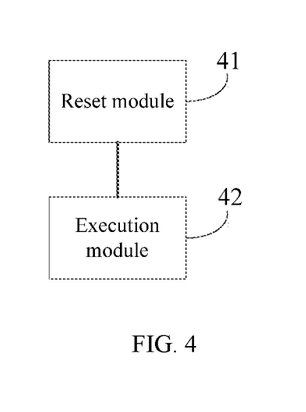
FIG. 4 depicts a structural block diagram of an apparatus for reducing continuous-wakeup delay of Bluetooth loudspeaker provided by embodiment four of the present disclosure.

FIG. 4 depicts a schematic structural block diagram of an apparatus for reducing continuous-wakeup delay of a Bluetooth loudspeaker according to embodiment four of the present disclosure, for the convenience of description, the part related to this embodiment of the present disclosure is merely shown.

The apparatus for reducing continuous-wakeup delay of the Bluetooth loudspeaker may be a software unit built in the Bluetooth loudspeaker, a hardware unit or a software and hardware combined unit, and may also be integrated into the Bluetooth loudspeaker as an independent pendant.

The apparatus for reducing the continuous-wakeup delay of the Bluetooth loudspeaker includes:

a reset module 41 configured to reset a wakeup flag bit to wait for a next wakeup when a stop-recording instruction sent by a terminal equipment through a Bluetooth serial port communication protocol is received; and an execution module 42 configured to execute a wakeup-interruption operation again after a preset wakeup keyword is received.

Optionally, the apparatus further includes a playing module configured to play the voice data when the voice data as fed back by the terminal equipment is received.

Optionally, the apparatus further includes an emptying module configured to empty the cached voice data.

Optionally, the apparatus further includes a cache module configured to cache the new voice data if the new voice data is collected.

Optionally, the apparatus further includes a first transmission module configured to transmit a re-awakening instruction to the terminal equipment through the Bluetooth serial port communication protocol.

Optionally, the apparatus further includes a second transmission module configured to transmit the cached new voice data to the terminal equipment after the instruction of notifying transmission of cache data sent by the terminal equipment through the Bluetooth serial port communication protocol is received.

Embodiment Five

Figure 5:
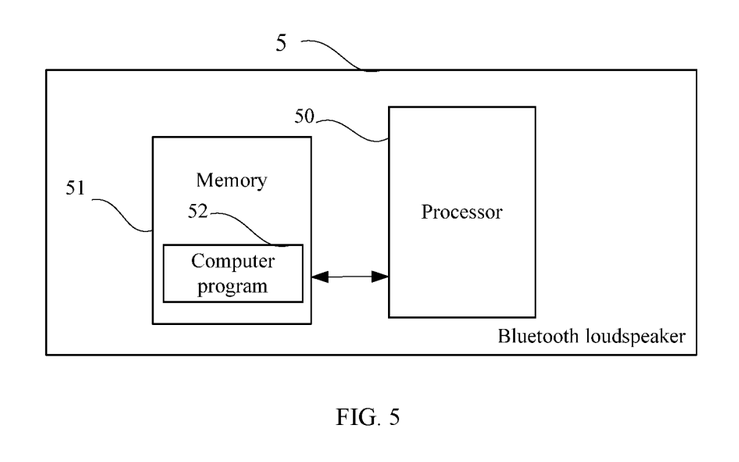
FIG. 5 depicts a structural block diagram of a Bluetooth loudspeaker provided by embodiment five of the present disclosure.

FIG. 5 depicts a structural block diagram of a Bluetooth loudspeaker 5 provided by embodiment five of the present disclosure. As shown in FIG. 5, the Bluetooth loudspeaker 5 in this embodiment includes: a processor 50, a memory 51 and a computer program 52 stored in the memory 51 and executable on the processor 50. When the computer program 52 is executed by the processor 50, the processor 50 is configured to implements steps in the aforesaid method embodiment one such as steps 101-105 shown in FIG. 1, or to implement steps in the aforesaid method embodiment two such as steps 201-202 shown in FIG. 2, or to implement steps in the method embodiment three such as steps 301-307 shown in FIG. 3. When the computer program 52 is implemented by the processor 50, functionalities of the various modules/units such as the functionalities of modules 41 and 42 shown in FIG. 4 are implemented.

Exemplarily, the computer program 52 may be divided into one or a plurality of modules/units, the one or plurality of modules/units are stored in the memory 51, and are executed by the processor 50 so as to implement the present disclosure. The one or plurality of modules/units may be a series of computer program instruction segments that can accomplish particular functionalities, these instruction segments are used for describing an executive process of the computer program 52 in the Bluetooth loudspeaker 5. For example, the computer program 52 may be divided into a reset module 41 and an execution module 42, and the concrete functions of the reset module 41 and the execution module 42 are respectively as follows:

The reset module 41 is configured to reset a wakeup flag bit to wait for a next wakeup when a stop-recording instruction sent by a terminal equipment through a Bluetooth serial port communication protocol is received;

The execution module 42 is configured to play voice data after the voice data as fed back by terminal equipment is received.

The Bluetooth loudspeaker 5 can include but is not limited to: the processor 50, the memory 51. The person of ordinary skill in the art may be aware of that, FIG. 5 is merely an example of the Bluetooth loudspeaker 5 and shouldn't be constituted as limitation to the Bluetooth loudspeaker 5, more or less components shown in FIG. 5 can be included, or some components or different components can be combined; for example, the Bluetooth loudspeaker 5 may also include an input and output device, a network access device, a bus, etc.

The so called processor 50 may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or as an alternative, the processor 50 may also be any conventional processor and so on.

The memory 51 can be an internal storage unit of the Bluetooth loudspeaker 5, such as a hard disk or a memory of the Bluetooth loudspeaker 5. The memory 51 may also be an external storage device of the Bluetooth loudspeaker 5, such as a plug-in hard disk, a SMC (Smart Media Card), a SD (Secure Digital) card, a FC (Flash Card) equipped on the Bluetooth loudspeaker 5. Further, the memory 51 may include both the internal storage unit and the external storage device of the Bluetooth loudspeaker 5, either. The memory 51 is configured to store the computer programs, and other procedures and data needed by the Bluetooth loudspeaker 5. The memory 51 may also be configured to store data that has been output or being ready to be output temporarily.

The person of ordinary skill in the art may get it clearly that, for describing conveniently and concisely, regarding the detailed working process of the system, apparatus and units described above, reference can be made to the corresponding process in the previously described method embodiments, and it is not repeatedly described herein.

In the embodiments of the present disclosure, the descriptions of the embodiments in the present disclosure are emphasized respectively, regarding the part in some embodiments which is not described in detail, reference can be made to related descriptions in other embodiments.

The person of ordinary skill in the art may be aware of that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The person of ordinary skill in the art could use different methods to implement the described functions for each particular application, however, such implementations should not be considered as going beyond the scope of the present disclosure.

It should be understood that, in the embodiments of the present disclosure, the disclosed system, apparatus/method could be implemented in other ways. For example, the apparatus embodiment described above are merely illustrative; for example, the division of the units is only a logical function division, and other division could be used in the actual implementation; for example, multiple units or components could be combined or integrated into another system, or some features can be ignored or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which may be located in one place, or be distributed to multiple network elements. A part or a whole of the elements could be selected according to the actual needs to achieve the object of the present embodiment.

In addition, the various functional units in each of the embodiments of the present disclosure may be integrated into a single processing unit, or exist individually and physically, or two or more than two units are integrated into a single unit. The aforesaid integrated unit may either be achieved by hardware, or be achieved in the form of software functional units.

If the integrated unit is achieved in the form of software functional units, and is sold or used as an independent product, it may be stored in a computer readable storage medium. Based on this understanding, a whole or part of flow process of implementing the method in the aforesaid embodiments of the present disclosure may also be accomplished by using computer program to instruct relevant hardware. When the computer program is executed by the processor, the steps in the various method embodiments described above may be implemented. Wherein, the computer program includes computer program codes, which may be in the form of source code, object code, executable documents or some intermediate form, etc. The computer readable medium may include: any entity or device that can carry the computer program codes, recording medium, USB flash disk, mobile hard disk, hard disk, optical disk, computer storage device, ROM (Read-Only Memory), RAM (Random Access Memory), and software distribution medium, etc.

As stated above, the embodiments described above are only intended to explain but not to limit the technical solutions of the present disclosure. Although the present disclosure has been explained in detail with reference to the above-described embodiments, it should be understood for the person of ordinary skill in the art that, the technical solutions described in each of the above-described embodiments can still be amended, or some technical features in the technical solutions can be replaced equivalently; and these amendments or equivalent replacements won't make the essence of corresponding technical solution to be broken away from the spirit and the scope of the technical solution in various embodiments of the present disclosure.

What is claimed is:

1. A method for reducing continuous-wakeup delay of a Bluetooth loudspeaker, comprising:
    resetting a wakeup flag bit to wait for a next wakeup, when a stop-recording instruction sent by a terminal equipment through a wireless serial port communication protocol is received; and
    executing a wakeup-interruption operation when a preset wakeup keyword is received;
    wherein after executing the wakeup-interruption operation again, the method further comprises emptying cached voice data.

2. The method according to claim 1, wherein after resetting a wakeup flag bit, the method further comprises:
    playing voice data if the voice data as fed back by the terminal equipment is received, wherein the voice data is a response data of a voice data collected when the wireless loudspeaker is previously awakened.

3. The method according to claim 1, wherein after emptying the cached voice data, the method further comprises:
    transmitting a re-awakening instruction to the terminal equipment through the wireless serial port communication protocol to indicate stopping performing a related operation of the previous wakeup, wherein stopping performing a related operation of the previous wakeup comprises at least one of following conditions: stopping the terminal equipment from receiving the response data of the voice data collected when the wireless loudspeaker is previously awakened, stopping the terminal equipment from transmitting the response data of the voice data collected when the wireless loudspeaker is previously awakened to the wireless loudspeaker, stopping the wireless loudspeaker from receiving the response data of the voice data collected when the wireless loudspeaker is previously awakened, stopping the wireless loudspeaker from playing the response data of the voice data collected when the wireless loudspeaker is previously awakened and stopping the terminal equipment from disconnecting with the wireless loudspeaker.

4. The method according to claim 3, wherein before transmitting the re-awakening instruction to the terminal equipment through the wireless serial port communication protocol, the method further comprises:

caching new voice data if the new voice data is collected.

5. The method according to claim 4, after caching the new voice data, the method further comprises:

transmitting the cached new voice data to the terminal equipment after an instruction of notifying transmission of cache data sent by the terminal equipment through the wireless serial port communication protocol is received.

6. The method according to claim 5, wherein after transmitting the new voice data to the terminal equipment, the method further comprises:

resetting the wakeup flag bit again to wait for a next wakeup when a new stop-recording instruction sent by the terminal equipment through the wireless serial port communication protocol is received.

7. A wireless loudspeaker, comprising: a memory, a processor and a computer program stored in the memory and executable by the processor, wherein when the computer program is executed by the processor, the processor is configured to implement the method according to claim 1.

8. A non-transitory computer readable storage medium which stores a computer program, wherein when the computer program is executed by the processor, the processor is configured to implement the method according to claim 1.

9. The method according to claim 1, wherein after executing the wakeup-interruption operation when the preset wakeup keyword is received, the method further comprises:

caching voice data by the wireless loudspeaker after a wakeup-interruption is generated by the wireless loudspeaker.

10. The method according to claim 9, wherein after caching the voice data by the wireless loudspeaker, the method further comprises:

transmitting a request for establishing a synchronous directional connection to the terminal equipment by the wireless loudspeaker after the voice data is cached by the wireless loudspeaker;

transmitting a procedure of establishing synchronous directional connection to the wireless loudspeaker by the terminal equipment after the request for establishing the synchronous directional connection is received; and transmitting a notification to the terminal equipment by the wireless loudspeaker after the synchronous directional connection is established by the wireless loudspeaker.

11. The method according to claim 10, wherein the notification is sent in a form of message.

12. The method according to claim 10, further comprising:

making a response by the terminal equipment after the notification is received by the terminal equipment, wherein the response is used for indicating that the wireless loudspeaker is able to send the voice data; and transmitting the voice data to the terminal equipment by the wireless loudspeaker after the response is received by the wireless loudspeaker.

13. The method according to claim 12, wherein the voice data is sent to the terminal equipment through a TCP/IP protocol.

14. The method according to claim 12, further comprising:

transmitting the voice data to the server to be parsed by the terminal equipment after the voice data is received by the terminal equipment.

15. The method according to claim 6, wherein after resetting the wakeup flag bit again to wait for a next wakeup, the method further comprises:

transmitting response data of the voice data to the terminal equipment by the server in a process of waiting for a next wake-up; and transmitting the response data to the wireless loudspeaker by the terminal equipment if the response data of the voice data is received by the terminal equipment.

16. The method according to claim 15, wherein said transmitting the response data to the wireless loudspeaker by the terminal equipment specifically comprises:

transmitting the response data to the wireless loudspeaker by the terminal equipment through the synchronous directional connection.

17. The method according to claim 15, further comprising:

receiving and playing the response data returned by the terminal equipment by the wireless loudspeaker.

18. The method according to claim 17, further comprising:

loading an echo cancellation firmware when the response data is played.

19. The method according to claim 17, further comprising:

emptying the cached voice data by the wireless loudspeaker after the response data is played by the wireless loudspeaker.

* * * * *